United States Patent
Ogasawara et al.

(10) Patent No.: US 11,243,609 B2
(45) Date of Patent: Feb. 8, 2022

(54) INFORMATION PROCESSING APPARATUS, INFORMATION PROCESSING METHOD, AND PROGRAM

(71) Applicant: Sony Interactive Entertainment Inc., Tokyo (JP)

(72) Inventors: Hidehiko Ogasawara, Tokyo (JP); Yoichi Nishimaki, Kanagawa (JP); Shinichi Hirata, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/253,836

(22) PCT Filed: Jul. 18, 2018

(86) PCT No.: PCT/JP2018/026941
§ 371 (c)(1),
(2) Date: Dec. 18, 2020

(87) PCT Pub. No.: WO2020/016970
PCT Pub. Date: Jan. 23, 2020

(65) Prior Publication Data
US 2021/0116998 A1 Apr. 22, 2021

(51) Int. Cl.
*G06F 3/01* (2006.01)
*G06T 7/70* (2017.01)
*G09G 5/373* (2006.01)

(52) U.S. Cl.
CPC ............... *G06F 3/013* (2013.01); *G06T 7/70* (2017.01); *G09G 5/373* (2013.01); *G06F 3/012* (2013.01); *G06T 2207/30201* (2013.01); *G09G 2310/04* (2013.01); *G09G 2340/0407* (2013.01); *G09G 2354/00* (2013.01)

(58) Field of Classification Search
CPC ....................................................... G06F 3/013
See application file for complete search history.

(56) References Cited

U.S. PATENT DOCUMENTS

| 9,996,151 | B2 | 6/2018 | Iwasaki | |
|---|---|---|---|---|
| 2016/0147301 | A1 | 5/2016 | Iwasaki | |
| 2017/0090562 | A1* | 3/2017 | Gustafsson | G06F 3/04845 |
| 2019/0378164 | A1* | 12/2019 | Eich | H04N 21/812 |

FOREIGN PATENT DOCUMENTS

| WO | 2015008654 A1 | 1/2015 |
|---|---|---|
| WO | 2017025487 A1 | 2/2017 |

OTHER PUBLICATIONS

International Search Report for corresponding PCT Application No. PCT/JP2018/026941, 3 pages, dated Sep. 11, 2018.
International Preliminary Report on Patentability and Written Opinion for corresponding PCT Application No. PCT/JP2018/026941, 12 pages, dated Jan. 28, 2021.

* cited by examiner

*Primary Examiner* — Roy P Rabindranath
(74) *Attorney, Agent, or Firm* — Matthew B. Dernier, Esq.

(57) ABSTRACT

An information processing apparatus estimates a position of interest and/or a direction of interest in which a user viewing a video displayed by a display apparatus is potentially interested, the position of interest and the direction of interest being other than a position to which a line of sight of the user is directed, and changes content of the video to be displayed by the display apparatus according to a result of the estimation.

6 Claims, 7 Drawing Sheets

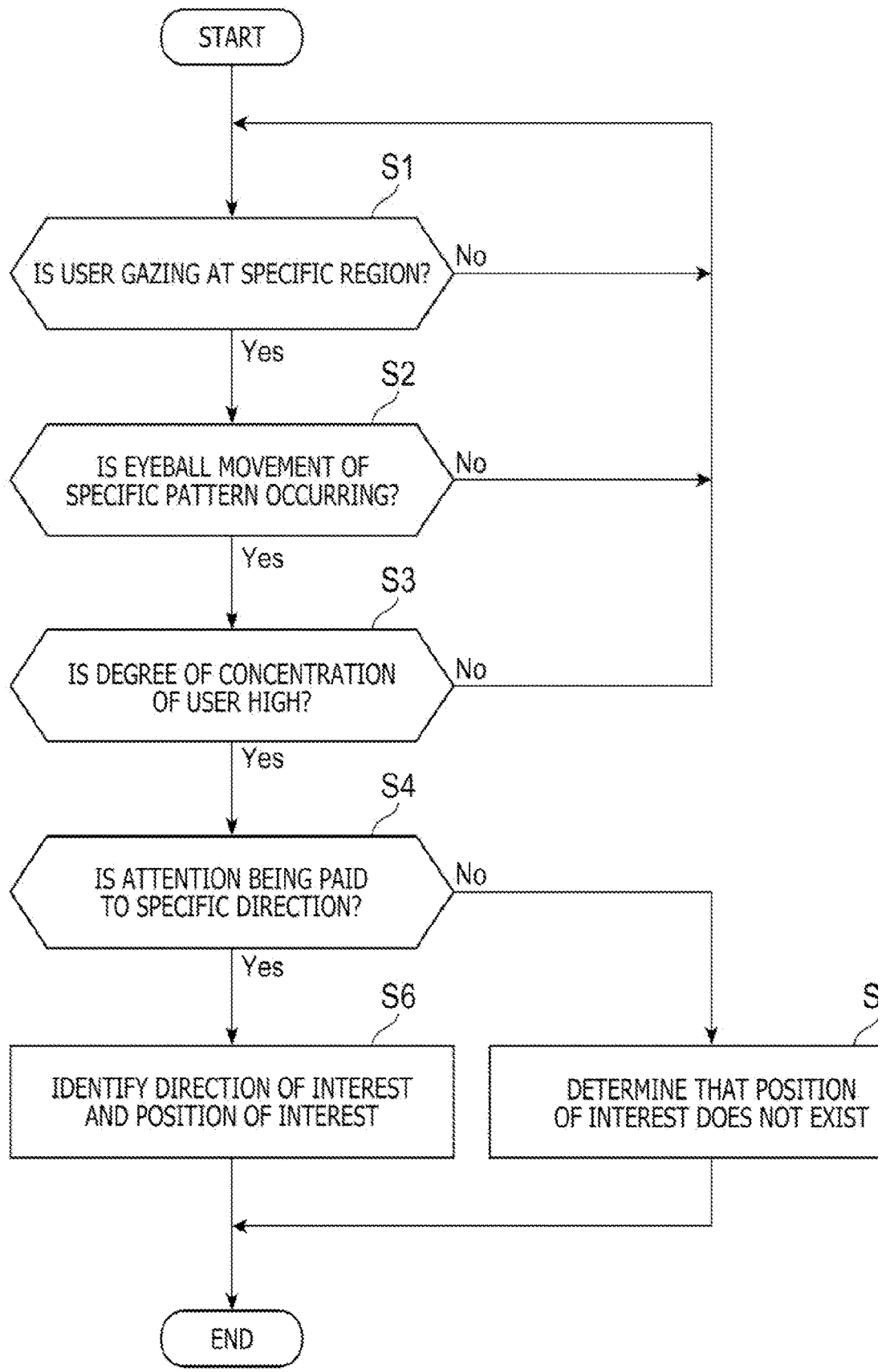

INFORMATION PROCESSING APPARATUS, INFORMATION PROCESSING METHOD, AND PROGRAM

TECHNICAL FIELD

The present invention relates to an information processing apparatus, an information processing method, and a program that perform control to cause a video display apparatus to display a video.

BACKGROUND ART

There is a known technique that identifies, in the case of presenting a video to the user, a point of regard of the user (a position to which the line of sight of the user is directed) using a method of detecting the orientation of the user's pupil, for example. Using such a technique, it is possible to identify, for example, which object the user is paying attention to among a plurality of objects appearing in the video.

SUMMARY

Technical Problem

In a case where the user is clearly gazing at one point in the video, the position of this point can be identified using the technique according to the above conventional example. However, since a visual field of a person has a certain size and the orientation of the line of sight constantly changes, the user is also visually recognizing a location other than a central point of the visual field. Thus, there is a case where the user is unconsciously interested in such a location. For example, there may be a case where the user is distracted by an object displayed at a position away from a position to which the line of sight of the user is currently directed. In this manner, a position in which the user is unconsciously interested and which is other than a position to which the line of sight of the user is directed has not been sufficiently considered so far.

The present invention has been made in consideration of the above circumstances. One of objects of the present invention is to provide an information processing apparatus, an information processing method, and a program that can perform a display taking into account a position which is away from a point of regard but the user is potentially paying attention to.

Solution to Problem

An information processing apparatus according to the present invention includes a position-of-interest estimation section configured to estimate a position of interest and/or a direction of interest in which a user viewing a video displayed by a display apparatus is potentially interested, the position of interest and the direction of interest being other than a position to which a line of sight of the user is directed; and a video display control section configured to change content of the video to be displayed by the display apparatus according to a result of the estimation.

An information processing method according to the present invention includes a step of estimating, by a position-of-interest estimation section, a position of interest and/or a direction of interest in which a user viewing a video displayed by a display apparatus is potentially interested, the position of interest and the direction of interest being other than a position to which a line of sight of the user is directed; and a step of changing, by a video display control section, content of the video to be displayed by the display apparatus according to a result of the estimating.

A program according to the present invention is a program for causing a computer to perform a step of estimating a position of interest and/or a direction of interest in which a user viewing a video displayed by a display apparatus is potentially interested, the position of interest and the direction of interest being other than a position to which a line of sight of the user is directed; and a step of changing content of the video to be displayed by the display apparatus according to a result of the estimating. The program may be stored in a computer-readable non-transitory information storage medium and provided.

BRIEF DESCRIPTION OF DRAWINGS

FIG. 3 is a view illustrating how a back side of a display apparatus looks like.

FIG. 7 is a diagram illustrating an example of a flow of processing performed by the information processing apparatus according to the embodiment of the present invention.

DESCRIPTION OF EMBODIMENT

Hereinafter, an embodiment of the present invention will be described in detail with reference to the drawings.

Figure 1:
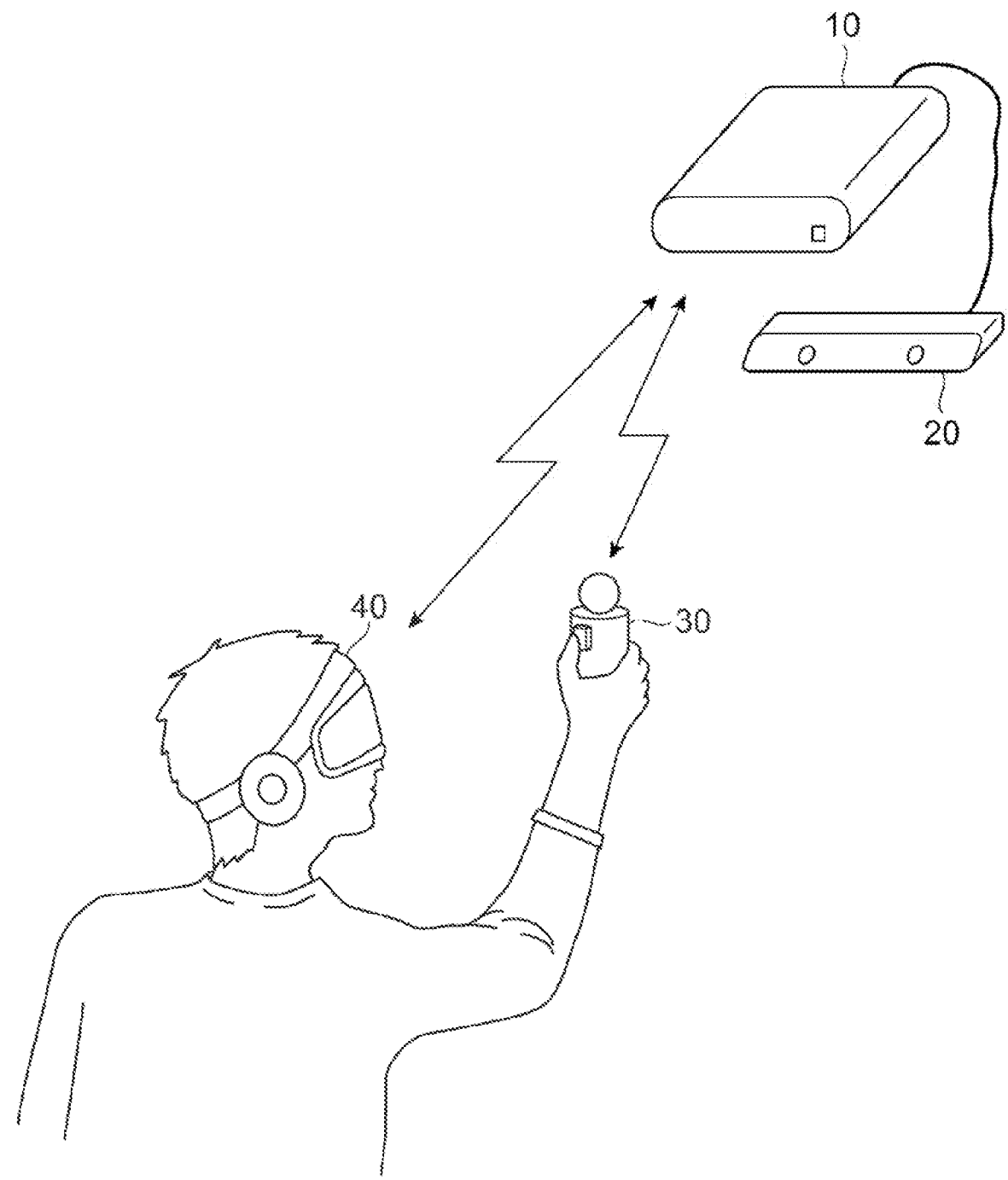
FIG. 1 is a diagram illustrating an overview of a video display system including an information processing apparatus according to an embodiment of the present invention.
Figure 2:
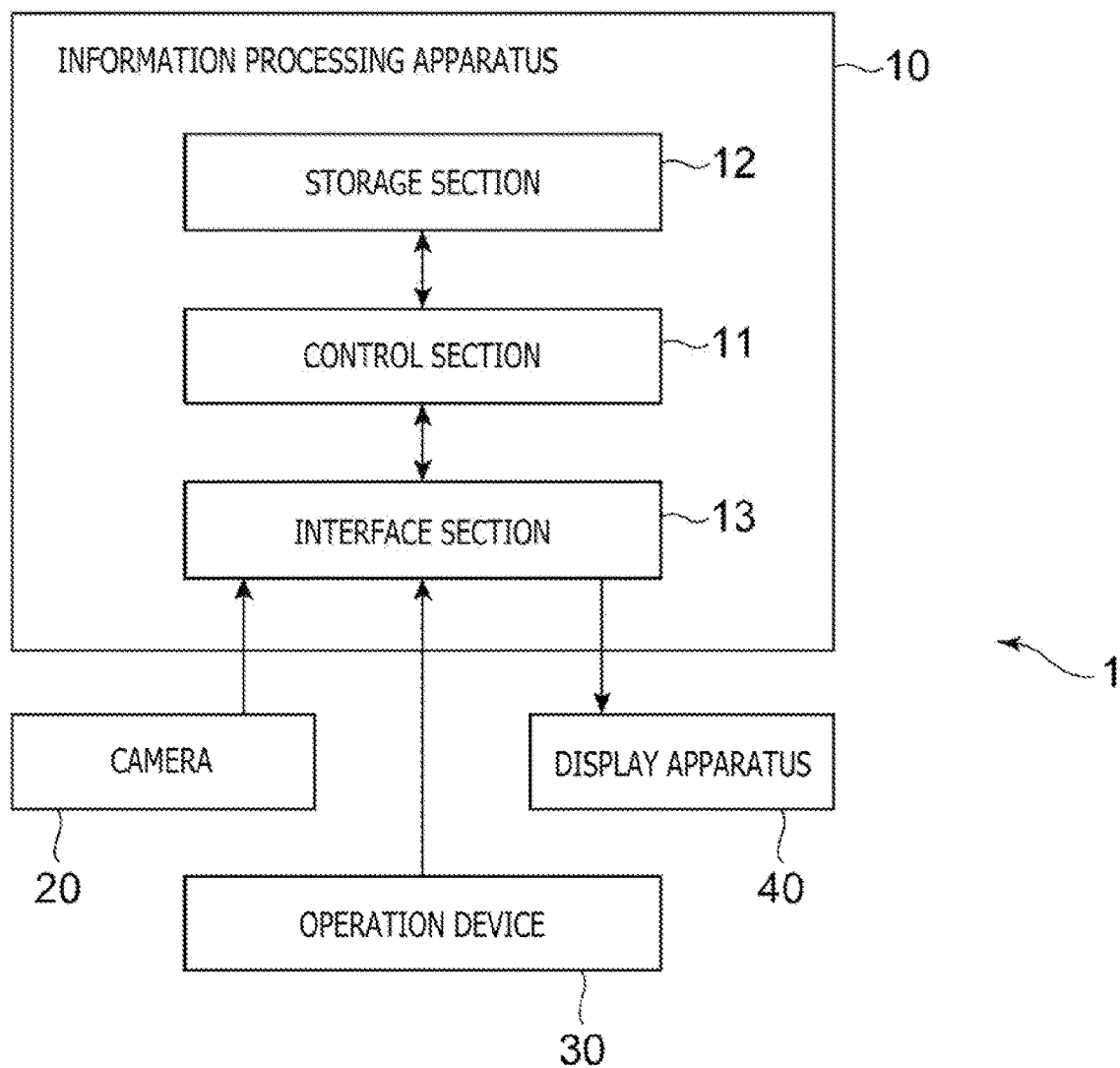
FIG. 2 is a configuration block diagram of the video display system.

FIG. 1 is an overview diagram of a video display system 1 including an information processing apparatus 10 according to the embodiment of the present invention. Further, FIG. 2 is a configuration block diagram illustrating a configuration of the video display system 1. As illustrated in these figures, the video display system 1 includes the information processing apparatus 10, a camera 20, an operation device 30, and a head-mounted display apparatus 40.

The information processing apparatus 10 is an apparatus that supplies a video required to be displayed by the display apparatus 40 and may be, for example, a home game machine, a portable game machine, a personal computer, a smartphone, a tablet, or the like. As illustrated in FIG. 2, the information processing apparatus 10 includes a control section 11, a storage section 12, and an interface section 13.

The control section 11 includes at least one processor such as a CPU (Central Processing Unit) and executes a program stored in the storage section 12 to perform various types of information processing. It is noted that a specific example of processing performed by the control section 11 in the present embodiment will be described later. The storage section 12 includes at least one memory device such as a RAM (Random Access Memory) and stores the program to be executed by the control section 11 and data to be processed by the program.

The interface section 13 is an interface for data communication with the camera 20, the operation device 30, and the display apparatus 40. The information processing apparatus 10 is connected to each of the camera 20, the operation device 30, and the display apparatus 40 via the interface section 13 by wire or wirelessly. Specifically, the interface section 13 includes a multimedia interface such as HDMI (registered trademark) (High-Definition Multimedia Interface) to transmit video and audio data supplied by the information processing apparatus 10 to the display apparatus 40. Further, the interface section 13 includes a data communication interface such as a USB (Universal Serial Bus) to receive video data captured by the camera 20 and a signal indicating the content of a user's operation input to the operation device 30.

The camera 20 is installed in front of the user using the video display system 1 and captures a video including the user and the surroundings of the user. As described later, the information processing apparatus 10 identifies the position of the display apparatus 40 in the real space by analyzing an image captured by the camera 20.

The operation device 30 is a device for receiving an operation input from the user. An operation member such as an operation button is provided on a surface of the operation device 30. The user grips the operation device 30 with the hand or attaches the operation device 30 to the hand to input an operation to the operation member. The operation device 30 transmits an operation signal to the information processing apparatus 10. The operation signal indicates the content of the operation input performed by the user.

The display apparatus 40 is a video display apparatus that the user wears on the head for use. The display apparatus 40 allows the user to view a video by displaying the video corresponding to a video signal transmitted from the information processing apparatus 10. Further, a light emitting element is provided on a front surface of the display apparatus 40. The camera 20 captures the light emitted by the light emitting element and the information processing apparatus 10 analyzes the image obtained by capturing the light so that the information processing apparatus 10 can identify the position of the display apparatus 40 in the real space. In particular, in the present embodiment, a plurality of light emitting elements is provided on the front surface of the display apparatus 40, and the information processing apparatus 10 identifies a change in the attitude of the display apparatus 40 by identifying a positional relationship among these light emitting elements. With this configuration, when the user changes the orientation of the face by moving the head, the information processing apparatus 10 can identify the change in the orientation thereof.

Figure 3:
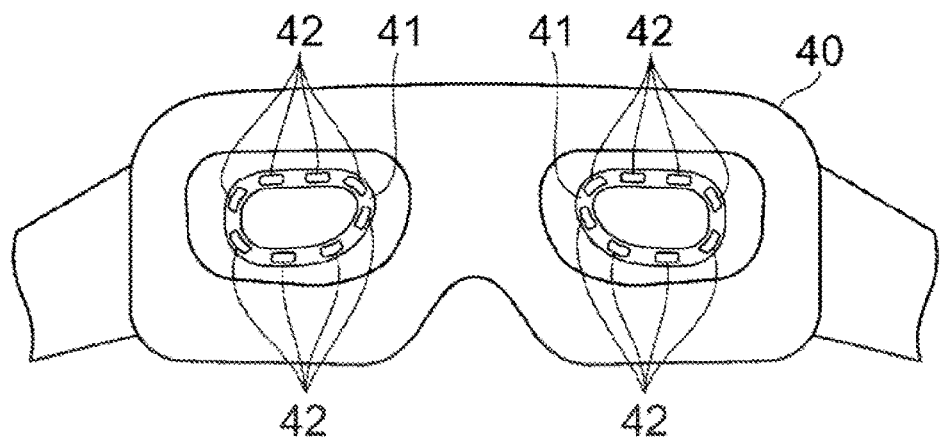
Figure 4:
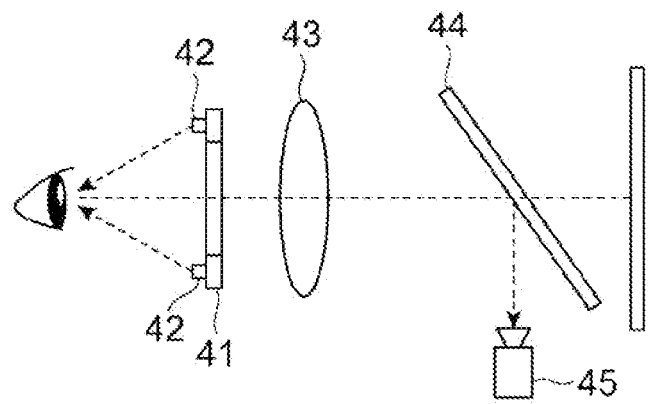
FIG. 4 is a diagram illustrating an internal configuration of the display apparatus.

Moreover, in the present embodiment, the display apparatus 40 includes a mechanism for identifying a change in a line-of-sight direction of the user in real time. Hereinafter, an example of this mechanism will be described. FIG. 3 is a view illustrating how a back side of the display apparatus 40 looks like. Further, FIG. 4 is a diagram schematically illustrating an internal configuration of the display apparatus 40 to illustrate a positional relationship among components that are provided to identify the orientation of one of pupils of the user. To identify the line-of-sight direction of the user, the display apparatus 40 includes a support body 41, a plurality of LEDs (Light Emitting Diodes) 42, a lens 43, a hot mirror 44, and an eyeball camera 45, as illustrated in these figures.

As illustrated in FIG. 3, the support body 41, which has an annular shape, is provided at each of positions facing the respective right and left eyes of the user on a back surface of the display apparatus 40. Moreover, the plurality of LEDs 42 is arranged in each of the right and left support bodies 41. Any of these LEDs 42 is fixed in such an orientation that the user's pupil can be irradiated with an infrared ray.

The hot mirror 44 is an optical element that has a characteristic of transmitting visible light and reflecting an infrared ray. A video displayed on a display element of the display apparatus 40 is presented to the user after passing through the hot mirror 44 and the lens 43. Meanwhile, light emitted from the LEDs 42 is reflected by the user's pupil, passes through the lens 43, and is further reflected by the hot mirror 44 before entering the eyeball camera 45. That is, the eyeball camera 45 captures the state of the user's eyeball reflecting light spots from the irradiation by the LEDs 42. The positions of the light spots reflected on a surface of the user's eyeball change in response to the movement of the user's eyeball. Therefore, the information processing apparatus 10 can identify the orientation of the user's pupil (line-of-sight direction) by analyzing the distribution of the light spots included in the image captured by the eyeball camera 45.

Further, although not illustrated here, the video display system 1 may include one or a plurality of vital sensors for detecting biometric information of the user. Such a vital sensor is connected to the information processing apparatus 10 and transmits detected biometric information of the user to the information processing apparatus 10 in real time. Examples of information that can be acquired by the vital sensor include brain waves, a heart rate, an amount of perspiration, a body temperature, an amount of saliva, a subcutaneous blood flow, and the like.

The vital sensor for this case may be provided on the display apparatus 40. The display apparatus 40 is mounted on the user's head. Therefore, providing the vital sensor at a position contacting the user's head on the surface of the display apparatus 40 enables detection of biometric information such as the user's brain waves.

Alternatively, the eyeball camera 45 may be used as the vital sensor. In order to record the eyeball movement of the user, the eyeball camera 45 captures a video around the eyeball of the user at a relatively high resolution and a high frame rate. Therefore, a temporal change in the thickness of a blood vessel in the vicinity of the eyeball of the user can be measured by analyzing the video captured by the eyeball camera 45. By using the information regarding the thickness of the blood vessel, the information processing apparatus 10 can estimate a change in the blood flow of the user. Further, the information processing apparatus 10 can measure the heart rate of the user by identifying a periodic change in the blood flow.

Figure 5:
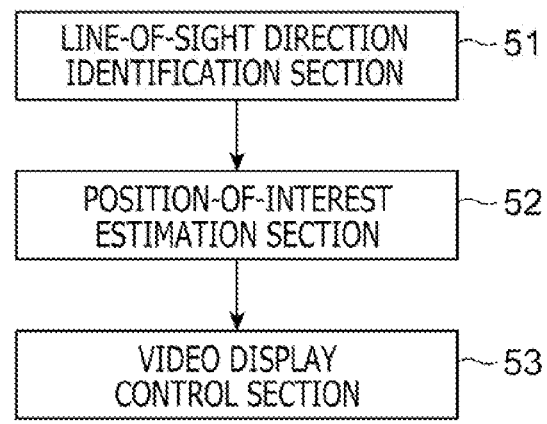
FIG. 5 is a functional block diagram of the information processing apparatus.

Next, functions implemented by the information processing apparatus 10 will be described with reference to FIG. 5. As illustrated in FIG. 5, the information processing apparatus 10 functionally includes a line-of-sight direction identification section 51, a position-of-interest estimation section 52, and a video display control section 53. These functions are implemented by the control section 11 executing the program stored in the storage section 12. This program may be provided to the information processing apparatus 10 via a communication network such as the Internet or may be stored in a computer-readable information storage medium such as an optical disc and provided.

The line-of-sight direction identification section 51 identifies a change in the line-of-sight direction of the user while the user is viewing a video displayed on the display apparatus 40 by the video display control section 53 to be described later. Specifically, the line-of-sight direction identification section 51 transmits a control signal for operating the above-described LEDs 42 to the display apparatus 40, and the eyeball camera 45 acquires a captured image obtained by capturing the user's pupil while the LEDs 42 emit infrared rays. Then, the line-of-sight direction identification section 51 uses the captured image to identify the line-of-sight direction (direction of the point of regard) of the user at the time when the image is captured. A line-of-sight direction identification process itself can be performed using a known method. The line-of-sight direction identification section 51 repeatedly performs such a line-of-sight direction identification process at short time intervals and stores the result thereof in the storage section 12. Accordingly, the line-of-sight direction identification section 51 can record the trajectory of movement of the line of sight of the user (a temporal change in the line-of-sight direction) while monitoring the line-of-sight direction.

The position-of-interest estimation section 52 estimates a position and/or a direction in which the user is potentially interested on the basis of the temporal change in the past line-of-sight direction of the user identified by the line-of-sight direction identification section 51. The position and the direction in which the user is potentially interested are other than the direction (point of regard) at which the user is currently gazing. Hereinafter, the position which is other than the point of regard and in which the user is estimated to be interested in this manner will be referred to as a position of interest. Further, the direction in which the user is estimated to be interested will be referred to as a direction of interest. The direction of interest is a direction from the point of regard toward the position of interest in a video plane. A specific example of a method of how the position-of-interest estimation section 52 estimates the direction of interest and the position of interest will be described later.

The video display control section 53 renders a video to be presented to the user and outputs a video signal indicating the content of the video to the display apparatus 40. For example, the video display control section 53 renders a spatial image depicting a state inside a virtual space in which a virtual object is placed, and causes the display apparatus 40 to display the spatial image. Moreover, in a case where the user wearing the display apparatus 40 on the head changes the orientation of the user's head, the video display control section 53 identifies the operation by analyzing an image captured by the camera 20 and moves the orientation of the viewpoint set in a virtual space so as to correspond to the change in the orientation of the user's head. Accordingly, the user can view the state inside the virtual space while changing the orientation of the viewpoint by moving the user's head. It is noted that, in a case where such control is performed, the user can look beyond a range that can be displayed by the display apparatus 40 at a time. Therefore, there is a possibility that the user is paying attention to a position where an object was displayed in the past but is not currently displayed on the display apparatus 40 according to the movement of the user's head. That is, the position of interest estimated by the position-of-interest estimation section 52 does not necessarily have to be a position in the video being displayed at this point in time and may be a position outside the screen.

Moreover, in the present embodiment, the video display control section 53 changes the content of a video to be supplied to the display apparatus 40 on the basis of the position of interest identified by the position-of-interest estimation section 52. As an example, the video display control section 53 renders a video in which the resolution of a region identified on the basis of the point of regard of the user and the position of interest is higher than the resolutions of the others. A specific example of the content of the video rendered by the video display control section 53 on the basis of the position of interest will be described later.

A specific example of the method of how the position-of-interest estimation section 52 estimates the direction of interest and the position of interest will be described below. The position-of-interest estimation section 52 estimates the position of interest of the user on the basis of a temporal change in the line-of-sight direction of the user recorded by the line-of-sight direction identification section 51 in the most recent past. Specifically, in a case where the eyeball of the user is directed to a vicinity of a specific position (point of regard), the eyeball of the user performs, in some cases, a reciprocating motion in which the eyeball of the user slightly moves from that position to another direction and immediately returns to that position. Usually, the user performs such eyeball movement not intentionally but unconsciously. As a type of such eyeball movement, what is called microsaccades is known. In a case where such eyeball movement is repeatedly performed toward a specific direction, there is a high possibility that the user is potentially paying attention to (or is interested in) that direction. Therefore, in a case where a temporal change in the line-of-sight direction identified by the line-of-sight direction identification section 51 includes a movement of a specific pattern, the position-of-interest estimation section 52 estimates the direction of interest on the basis of the movement of the specific pattern. Moreover, the position-of-interest estimation section 52 estimates that the position of interest is at the position indicated by the direction of interest.

Figure 6:
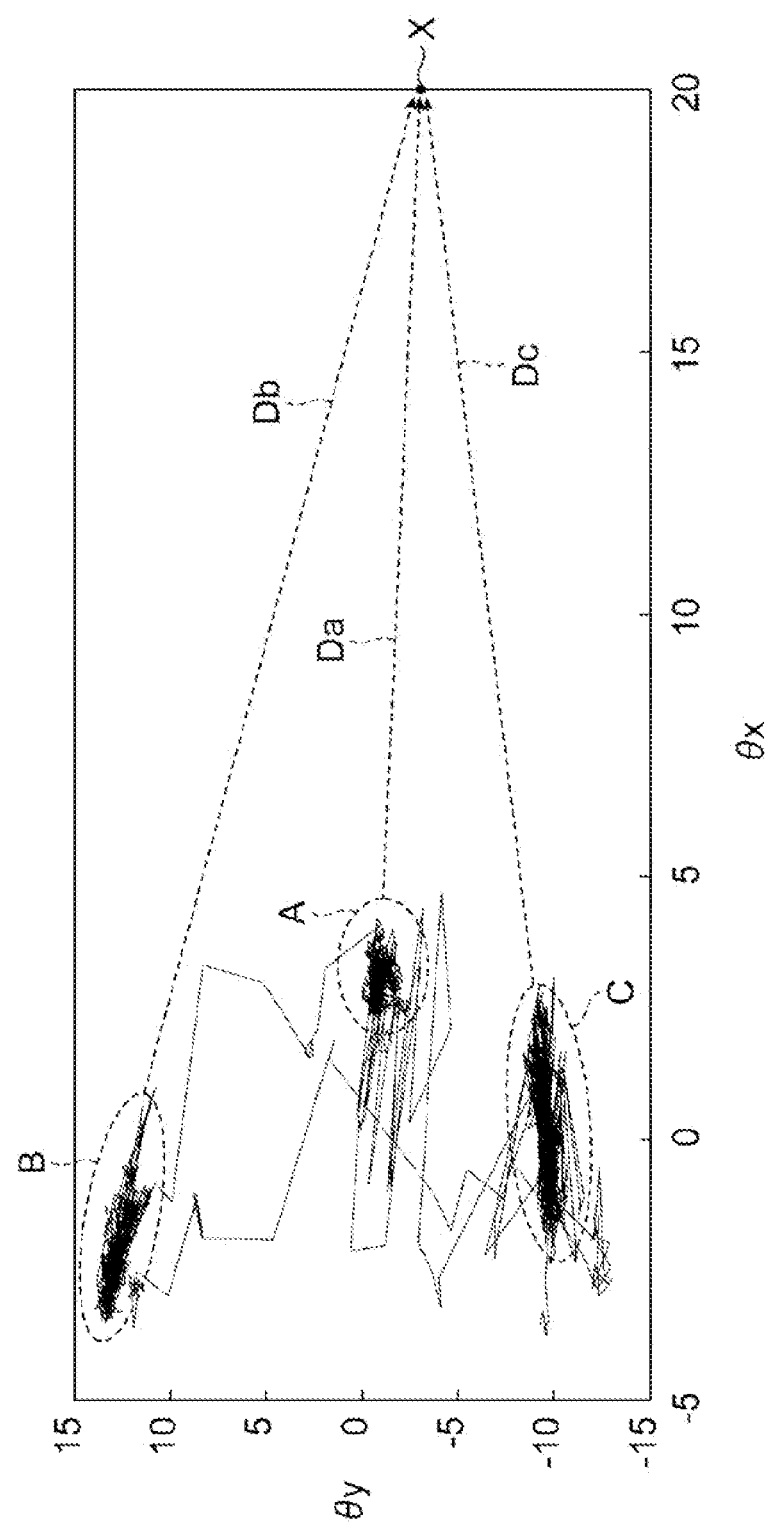
FIG. 6 is a diagram illustrating an example of a temporal change in a line-of-sight direction.

FIG. 6 illustrates an example of a temporal change in the line-of-sight direction of the user identified by the line-of-sight direction identification section 51. A horizontal axis of this figure represents an angle θx in a horizontal direction, while a vertical axis represents an angle θy of a vertical direction. A solid line in the figure represents the temporal change in the line-of-sight direction. In this example, the point of regard of the user has approximately moved from a region A to a region B and then to a region C over time. However, no matter which region the line of sight of the user is directed to, the line-of-sight direction of the user repeats a fine reciprocating motion that moves rightward in the figure and returns. The direction of this reciprocating motion is estimated to be the direction of interest. However, the user does not move the eyeball until the position of interest is located at the center of the visual field. Therefore, although it is possible to roughly estimate which direction the direction of interest is from the reciprocating motion performed only a few times, it is difficult to specifically estimate where the specific position of interest is (that is, how far it is from the point of regard to the position of interest). Therefore, the position-of-interest estimation section 52 may estimate the position of interest from the reciprocating motion performed for a certain amount of time in the most recent past.

In the example of FIG. 6, in a case where the point of regard exists in the region A in the middle row, it is estimated from the orientation of the reciprocating motion that the direction of a broken line Da, which heads slightly downward to the right in the figure, is the direction of interest.

Moreover, it is also estimated that the orientation indicated by each of broken lines Db and Dc in the figure is the direction of interest in a case where the point of regard exists in each of the upper region B and the lower region C. As long as the position of interest does not change while the line of sight of the user is moving from the region A to the region B and then to the region C, a position X corresponding to the intersection of the three broken lines Da, Db, and Dc is estimated to be the position of interest. It is noted that, even in a case where a plurality of directions of interest identified with the plurality of points of regard does not intersect one point, it is possible to estimate that the vicinity of the position where the plurality of directions of interest gathers is the position of interest.

Further, the position-of-interest estimation section 52 may identify the position of interest by referring to the content of a video being displayed by the video display control section 53. For example, in the example of FIG. 6 described above, while the point of regard remains in the region A, it is not possible to identify, just from line-of-sight direction information, where on the broken line Da the position of interest is. In this case, in a case where an object (candidate object) that may possibly attract the user's interest is being displayed on the broken line Da, the position-of-interest estimation section 52 may estimate the display position of the object as the position of interest. In order to perform such an estimation, the position-of-interest estimation section 52 receives, from the video display control section 53, information indicating the positions of candidate objects that are currently being displayed on the screen. Then, the position-of-interest estimation section 52 estimates, as the position of interest, the display position of a candidate object closest to the direction of interest among the candidate objects being displayed.

It is noted that, instead of rendering the state of the virtual space, the video display control section 53 may, in some cases, cause the display apparatus 40 to display a video obtained by capturing the state of the real space, a video preliminarily prepared, or the like. Even in such a case, an object that is displayed in the video and may possibly attract the user's interest may be identified as the candidate object by analyzing the video displayed.

Moreover, the position-of-interest estimation section 52 may acquire information indicating a viewing state of the user, such as whether or not the user is concentrating on a video, on the basis of various pieces of information, and use the information to estimate the position of interest. For example, the position-of-interest estimation section 52 can identify an event such as a timing at which the user blinks or a change in the pupil diameter by analyzing a video captured by the eyeball camera 45. Generally, it is assumed that the user blinks before concentrating on a video or the pupil diameter increases as the degree of concentration increases. Therefore, using such information obtained by observing the user's pupil (an index value of how much the user is interested in the video) enables the position-of-interest estimation section 52 to estimate the degree of the user's concentration on the video at this point in time.

However, the pupil diameter of a person is affected by a change in the luminance of a video being viewed by the person. Moreover, how the luminance of the video affects the pupil diameter is different depending on the person. Different types of people are affected in different ways; there are the type of people who are susceptible to the luminance of the entire video, the type of people who are susceptible to the luminance of the vicinity of the point of regard, the type of people who are in the middle thereof, and the like.

Therefore, the position-of-interest estimation section 52 may acquire, for each user, information regarding the luminance of the video and information regarding the pupil diameter observed when the video is being displayed, and use the acquired pieces of information to identify information indicating how the luminance of the video changes the pupil diameter of the user.

Specifically, when each user starts using the display apparatus 40, the position-of-interest estimation section 52 causes the display apparatus 40 to display images having various background colors and luminance prepared for calibration. Then, the position-of-interest estimation section 52 measures the size of the pupil diameter of the user who is viewing these calibration images, and uses the result of the measurement as teacher data to determine a reference value, which is used when the position-of-interest estimation section 52 estimates the degree of concentration of the user. Further, the position-of-interest estimation section 52 may periodically acquire the luminance of the video being displayed and the result of the measurement of the pupil diameter as teacher data while the display apparatus 40 is actually being used and perform machine learning to create an estimator for estimating the degree of concentration of each user. It is noted that, when performing such learning, it is desirable to use, as inputs, both the luminance of the entire video being displayed and the luminance of a region currently being gazed at by the user. In this manner, the position-of-interest estimation section 52 can accurately estimate the degree of concentration regardless of the influence of the luminance of the video currently being displayed and the individual difference of the user who is using the display apparatus 40.

Further, the position-of-interest estimation section 52 may estimate the degree of concentration of the user using the measurement result of the vital sensor described above. In this case as well, the position-of-interest estimation section 52 can accurately estimate the degree of concentration by performing machine learning using biometric information measured by the vital sensor as teacher data and preliminarily learning, for each user, how the biometric information affects the degree of concentration.

Further, the position-of-interest estimation section 52 may estimate the position of interest using information regarding a dominant eye. It is known that a person has a dominant right or left eye, like a dominant hand or the like. The position-of-interest estimation section 52 may use the information regarding the dominant eye to estimate the position of interest of the user by combining both the two estimation results of the positions of interest obtained on the basis of the respective right and left eyeball movements after weighing the two estimation results according to which eye is dominant, for example. Alternatively, in a case where the estimation results of the right and left positions of interest are contradictory, the estimation result of the dominant eye may be preferentially adopted. It is noted that which eye is the dominant eye of the user may be preliminarily input by the user himself/herself or may be estimated from the movement of the user's line of sight against the video or the like.

Hereinafter, an example of a flow of processing performed by the position-of-interest estimation section 52 will be described with reference to a flow diagram of FIG. 7. First, the position-of-interest estimation section 52 determines whether or not the user is gazing at a specific region on the basis of a temporal change in the line-of-sight direction of the user (S1). Specifically, in a case where the moving range of the line-of-sight direction of the user is within a predetermined size during a predetermined period in the most recent past, the position-of-interest estimation section 52 estimates that the user is gazing at a specific region.

In a case where the user is gazing at the specific region, the position-of-interest estimation section 52 further determines whether or not eyeball movement of a specific pattern is occurring on the basis of a trajectory of the line-of-sight direction of the user while the user is gazing at the region (S2). The eyeball movement of the specific pattern may be the above-described short-distance reciprocating motion toward a specific direction or the like. For example, in a case where the reciprocating motion has been performed a predetermined number of times or more during a predetermined period in the most recent past, the position-of-interest estimation section 52 determines that the eyeball movement of the specific pattern is occurring.

In a case where the position-of-interest estimation section 52 determines in S2 that the eyeball movement of the specific pattern has occurred, the position-of-interest estimation section 52 subsequently determines the degree of concentration of the user at this point in time on the basis of a given determination criterion (S3). Specifically, as described above, the position-of-interest estimation section 52 determines whether or not the user is concentrating on the video on the basis of the blink frequency, the pupil diameter, and various other types of biometric information. In a case where the position-of-interest estimation section 52 determines that the user is concentrating on the video, the position-of-interest estimation section 52 proceeds to S4 and performs a process of estimating the position of interest of the user. On the other hand, in a case where any of the determination conditions up to this point is not satisfied, the position-of-interest estimation section 52 returns to S1 and repeats the processes of S1 to S3 until each determination condition is satisfied. It is noted that, in a case where the position-of-interest estimation section 52 estimates the degree of concentration on the basis of the result of machine learning or the like, the position-of-interest estimation section 52 also calculates the degree of reliability of the result of the estimation (an index value indicating how reliable the result of the estimation is). In a case where the degree of reliability is low (that is, in case of failure of accurately estimating how much the user is concentrating), the position-of-interest estimation section 52 may proceed to a process of S4.

In a case where the position-of-interest estimation section 52 determines in S3 that the user is concentrating on the video, the position-of-interest estimation section 52 determines whether or not the user is paying attention to any specific direction on the basis of data of the eyeball movement of the specific pattern detected in S2 (S4). In a case where the orientation of the eyeball reciprocating motion is not concentrated on any specific direction, it is assumed that the user is simply concentrating and focusing on the current point of regard. Therefore, the position-of-interest estimation section 52 determines that the position of interest does not exist (S5).

On the other hand, in a case where the eyeball reciprocating motion is directed to any specific direction, that direction is estimated to be the direction of interest. Therefore, the position-of-interest estimation section 52 identifies the direction of interest and the position of interest on the basis of the orientation of the reciprocating motion and other conditions (position information of a candidate object being displayed on the screen, and the like) (S6). Since such processing is periodically performed, the video display control section 53 can present a video taking into account the position of interest to the user.

The following describes a specific example of a method of how the video display control section 53 controls the content of the video to be presented to the user according to the position of interest and the direction of interest.

As a first example, in a case where the video display control section 53 displays a plurality of objects on the screen, the video display control section 53 may make a display mode different between an object existing at the position of interest or in the direction of interest and the other objects. Specifically, the video display control section 53 may change the color, lightness, size, or the like of the object that exists in the vicinity of the position of interest or exists at a position in the vicinity of the direction of interest as a target for highlighting. On the other hand, in order to make objects located away from the position of interest inconspicuous, the video display control section 53 may reduce their lightness, increase their transparency, or change their display to a defocused display. By performing such control, it is possible to make the user consciously pay attention to the target in which the user is unconsciously interested.

Figure 8A:
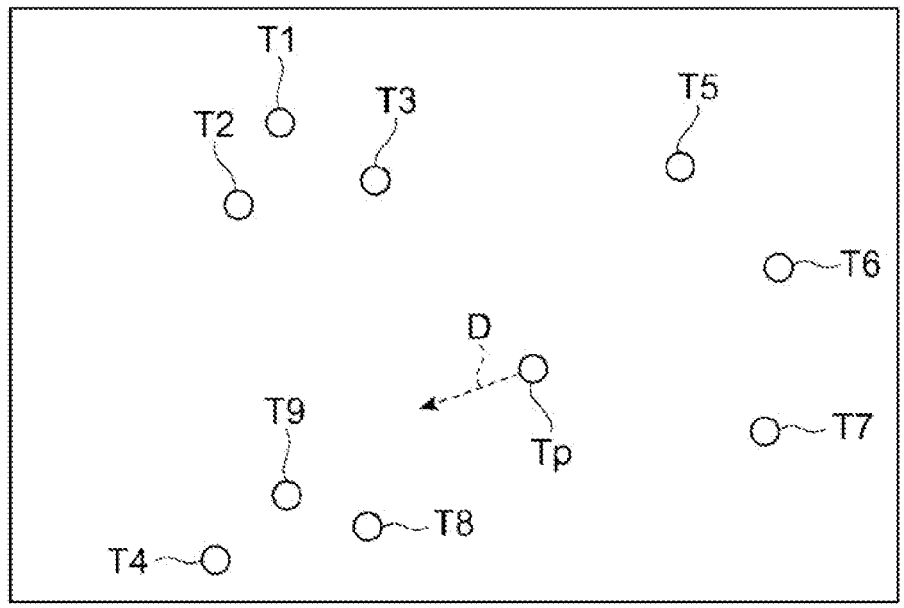
FIG. 8A is a diagram illustrating a state before a change is made in an example in which a display mode of targets is changed according to a direction of interest.
Figure 8B:
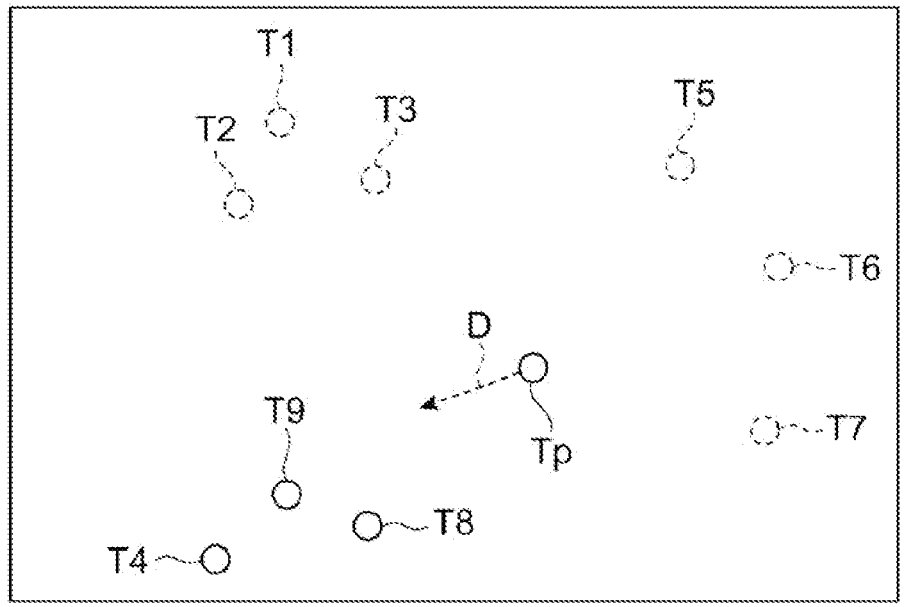
FIG. 8B is a diagram illustrating a state after the change is made in the example in which the display mode of the targets is changed according to the direction of interest.

FIG. 8 illustrates an example of a video displayed under such control. FIG. 8A illustrates a state before the display is changed. FIG. 8B illustrates a state after the display is changed according to the direction of interest. In the example of these figures, a plurality of targets T is displayed in the video. It is assumed that the line of sight of the user is directed to a target Tp among the plurality of targets T, and a lower left direction from the target Tp is identified as a direction of interest D. In this case, among the plurality of targets included in the video, lower left targets T4, T8, and T9 in the vicinity of the direction of interest are not changed between FIGS. 8A and 8B, while the other targets are changed to be inconspicuous in FIG. 8B.

It is noted that although, here, the video display control section 53 performs control such that the objects matching the position of interest or the direction of interest become conspicuous, the video display control section 53 may perform the control in an opposite manner. For example, in a game or the like, a target object desired to attract the user's attention is assumed to be displayed in a video. In this case, in a case where the user is estimated to be interested in a different position or direction from the target object, the video display control section 53 may perform display control such that the target object is gradually highlighted.

Figure 9:
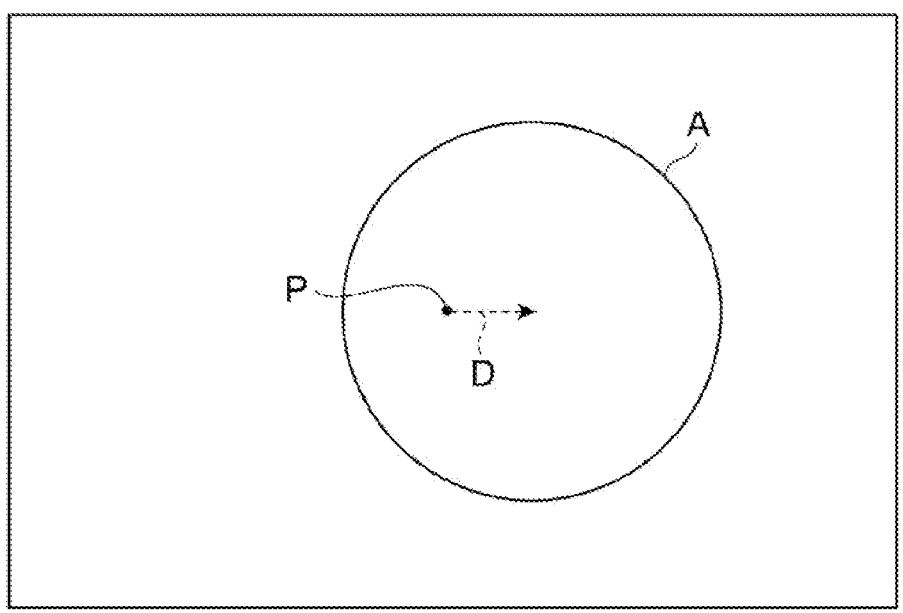
FIG. 9 is a diagram for describing an example of performing foveated rendering according to a direction of interest.

As a second example, the video display control section 53 may perform foveated rendering taking into account the direction of interest or the position of interest. Foveated rendering is a method of keeping the rendering load low by rendering a region of attention centered around the point of regard or the like of the user at a relatively high resolution while rendering a surrounding region outside the region of attention at a relatively low resolution. In the present embodiment, the point of regard is not the center of the region of attention, and a range that extends from the point of regard in the direction of interest is set as the region of attention (that is, a position shifted from the point of regard in the direction of interest is set as the center of the region of attention). Accordingly, it is possible to render, at a high resolution, a range in which the user is viewing with real interest or to which the user is highly likely to pay attention from now. FIG. 9 illustrates an example of a region of attention A set in this manner on the basis of a point of regard P and a direction of interest D. Further, in a case where not only the direction of interest but also where on the screen the position of interest is have been able to be estimated, the video display control section 53 may determine the region of attention so as to include both the position of interest and the point of regard.

Moreover, in a case where such foveated rendering is performed, the resolution of the surrounding region, to which the user is assumed not to be paying attention very much, is reduced. However, the user may, in some cases, notice the reduction in resolution. In a case where the user notices the reduction in resolution, it is assumed that the line of sight of the user becomes an unnatural movement, for example, the point of regard or the position of interest suddenly turns to the region whose resolution has been reduced. Therefore, in a case where the position-of-interest estimation section 52 detects the movement of the line of sight of the user reacting to such a reduction in resolution, the video display control section 53 may perform control for improving the image quality such as suspending the foveated rendering or increasing the resolution of the surrounding region. By performing such control, the video display control section 53 can keep the rendering load low while preventing the user from experiencing a feeling of strangeness.

As a third example, the video display control section 53 may vary the update frequency of an image for each region. In this example as well, as in the second example, the method of rendering a displayed image is varied between the region of attention to which the user is assumed to be paying attention and the surrounding region outside the region of attention. However, instead of varying the resolution in a frame image displayed at a time for each region as in the second example, the video display control section 53 varies the update frequency (frame rate) of a video for each region. For example, the video display control section 53 performs control so as to reduce the update frequency of a frame image in the surrounding region to half that in the region of attention while making the update frequency of the video in the region of attention relatively higher than the update frequency in the surrounding region. Such a method eliminates the need for the information processing apparatus 10 to transmit, to the display apparatus 40, the entire frame image to be displayed by the display apparatus 40 in every frame. Accordingly, it is possible to reduce the amount of data required to be transmitted from the information processing apparatus 10 to the display apparatus 40 per unit time. Even in a case where the communication band is relatively small, a video that is less likely to give a feeling of strangeness can be presented to the user. In this third example as well, the position and size of the region of attention are determined on the basis of the position of interest and the direction of interest. Therefore, in a case where the user is interested in a location other than the point of regard, a video including that location can be presented at a high resolution.

As a fourth example, the video display control section 53 may preliminarily render a region in the vicinity of the position of interest at a high resolution. In this example as well, the video display control section 53 performs control in a similar manner to foveated rendering. However, unlike the previous example, the video display control section 53 determines the region of attention on the basis of the point of regard. Meanwhile, in a case where the position of interest in which the user is interested exists other than the point of regard, it is expected that the user moves the line of sight to that position (that is, the position of interest becomes a new point of regard). Therefore, the video display control section 53 also preliminarily prepares an image rendered at a high resolution for a region in the vicinity of the position of interest in a similar manner to a region in the vicinity of the point of regard. Then, when the point of regard of the user moves to the vicinity of this position of interest, the video display control section 53 generates a video to be displayed on the display apparatus 40 by using the preliminarily rendered image. By performing such control, in a case where the user moves the line-of-sight direction from the previous point of regard to the position of interest, the video in which the new point of regard is rendered at a high resolution can be immediately presented to the user without waiting time.

Moreover, in a case where the position of interest is away from the current point of regard by a predetermined distance or more, the video display control section 53 may reduce the region of attention, which is the target of foveated rendering. In a case where the user is estimated to be interested in a position far away from the current point of regard, it is highly likely that the user attempts to move the viewpoint from the current point of regard to the position of interest at a relatively high speed over a large distance by changing the orientation of the head or the like. During such a large viewpoint movement, it is difficult to check in detail the displayed video over a wide range. Therefore, even if the region to be rendered at a high resolution is reduced, it is less likely that the user experiences a feeling of strangeness. Therefore, in a case where the viewpoint movement to such a distant position of interest is determined to start, the video display control section 53 reduces the region of attention and, at the same time, preliminarily renders a region in the vicinity of the position of interest, which is the destination of the movement, at a high resolution. Accordingly, the video display control section 53 can proceed with preparations for displaying the region attracting the user's interest at a high resolution while suppressing an increase in the amount of data transmission and rendering load.

As a fifth example, the video display control section 53 may preferentially render the position of interest at a high resolution. In this example, as with the second example and the like, the video display control section 53 performs processing similar to foveated rendering in which the resolution is varied for each region. However, unlike the second example and the like, the video display control section 53 sets a region in the vicinity of the position of interest as the region of attention to be rendered at a high resolution, regardless of the point of regard. This allows the line of sight of the user to be naturally guided to the position of interest. Further, the target to be rendered at a high resolution by the video display control section 53 may include not only the vicinity of the position of interest but also a region including a path from the current point of regard to the position of interest. Additionally, the video display control section 53 may further reduce the resolution of a region other than the vicinity of the position of interest and the path to that position.

It is noted that the various processes described above may be applied in combination. For example, in each of the examples other than the third example, the update frequency of an image in a region in which rendering is performed at a higher resolution than the other regions may also be made higher than that in the other regions. Further, in the above description, in a case where the processing corresponding to foveated rendering is performed, the resolution is varied in two stages, i.e., the region of attention and the surrounding region. However, the embodiment is not limited thereto. The video may be divided into regions in three or more stages such that the resolution and the update frequency are varied for each region.

As described above, the information processing apparatus 10 according to the embodiment of the present invention can estimate a position or a direction in which the user is interested and which is other than the point of regard on the basis of a temporal change in the line of sight of the user. Moreover, since the information processing apparatus 10 presents to the user a video that changes according to the position of interest and the direction of interest estimated in this manner, the information processing apparatus 10 can realize a display with a reduced rendering load and a reduced communication band while naturally guiding the line of sight of the user and preventing the user from experiencing a feeling of strangeness.

It is noted that the embodiment of the present invention is not limited to the above description. For example, although, in the above description, the camera 20 identifies a change in the orientation of the display apparatus 40, various other methods may be used to identify a change in the orientation of the display apparatus 40. Further, the method for identifying a change in the line-of-sight direction of the user in the display apparatus 40 is not limited to the one described above, and various methods can be used.

REFERENCE SIGNS LIST

1 Video display system, 10 Information processing apparatus, 11 Control section, 12 Storage section, 13 Interface section, 20 Camera, 30 Operation device, 40 Display apparatus, 41 Support body, 42 LED, 43 Lens, 44 Half mirror, 45 Eyeball camera, 51 Line-of-sight direction identification section, 52 Position-of-interest estimation section, 53 Video display control section

The invention claimed is:

1. An information processing apparatus comprising:
a position-of-interest estimation section configured to estimate a position of interest and/or a direction of interest in which a user viewing a video displayed by a display apparatus is potentially interested, the position of interest and the direction of interest being other than a position to which a line of sight of the user is directed; and
a video display control section configured to change content of the video to be displayed by the display apparatus according to a result of the estimation, the video display control section highlighting, among a plurality of objects included in the video, an object determined according to the position of interest and/or the direction of interest, wherein:
the video display control section causes the display apparatus to display a video in which a region determined according to the position to which the line of sight of the user is directed is rendered at a higher resolution than a resolution of a region surrounding the region, while preliminarily rendering, at a high resolution, a region determined according to the position of interest and, when the line of sight of the user is directed to the position of interest, generating a video to be displayed by the display apparatus using a preliminarily rendered image, and
the video display control section changes a size of the region to be rendered at a high resolution according to a distance between the position to which the line of sight of the user is directed and the position of interest.

2. The information processing apparatus according to claim 1, wherein the video display control section causes the display apparatus to display a video in which a region determined according to the position to which the line of sight of the user is directed and the direction of interest is rendered at a higher resolution than a resolution of a region surrounding the region.

3. The information processing apparatus according to claim 1, wherein the video display control section causes the display apparatus to display a video in which a region determined according to the position of interest is rendered at a higher resolution than a resolution of a region surrounding the region.

4. The information processing apparatus according to claim 1, wherein the video display control section causes the display apparatus to display a video in which a region determined according to the position of interest and/or the direction of interest is updated more frequently than a region surrounding the region.

5. An information processing method comprising:
estimating a position of interest and/or a direction of interest in which a user viewing a video displayed by a display apparatus is potentially interested, the position of interest and the direction of interest being other than a position to which a line of sight of the user is directed; and
changing content of the video to be displayed by the display apparatus according to a result of the estimating and highlighting, among a plurality of objects included in the video, an object determined according to the position of interest and/or the direction of interest, wherein:
the changing the content action causes the display apparatus to display a video in which a region determined according to the position to which the line of sight of the user is directed is rendered at a higher resolution than a resolution of a region surrounding the region, while preliminarily rendering, at a high resolution, a region determined according to the position of interest and, when the line of sight of the user is directed to the position of interest, generating a video to be displayed by the display apparatus using a preliminarily rendered image, and
the changing the content action changes a size of the region to be rendered at a high resolution according to a distance between the position to which the line of sight of the user is directed and the position of interest.

6. A non-transitory, computer readable medium having a computer program stored thereon, which when executed by a computer, causes the computer to perform an information processing method by carrying out actions, comprising:
estimating a position of interest and/or a direction of interest in which a user viewing a video displayed by a display apparatus is potentially interested, the position of interest and the direction of interest being other than a position to which a line of sight of the user is directed; and
changing content of the video to be displayed by the display apparatus according to a result of the estimating and highlighting, among a plurality of objects included in the video, an object determined according to the position of interest and/or the direction of interest, wherein:
the changing the content action causes the display apparatus to display a video in which a region determined according to the position to which the line of sight of the user is directed is rendered at a higher resolution than a resolution of a region surrounding the region, while preliminarily rendering, at a high resolution, a region determined according to the position of interest and, when the line of sight of the user is directed to the position of interest, generating a video to be displayed by the display apparatus using a preliminarily rendered image, and the changing the content action changes a size of the region to be rendered at a high resolution according to a distance between the position to which the line of sight of the user is directed and the position of interest.

\* \* \* \* \*